2 Sheets—Sheet 1.

G. FLEWWELLING & G. J. HARRIS,

Assignors to THE DIAMOND MATCH COMPANY.

MACHINE FOR SAWING MATCH CARDS.

No. 10,468. Reissued Apr. 15, 1884.

WITNESSES:
T. S. West,
Wm. T. Emerson.

INVENTORS:
G. FLEWWELLING,
G. J. HARRIS,
BY H. W. Beadle & Co.
ATTYS.

THE NORRIS PETERS CO., PHOTO-LITHO., WASHINGTON, D. C.

G. FLEWWELLING & G. J. HARRIS,

Assignors to THE DIAMOND MATCH COMPANY.

MACHINE FOR SAWING MATCH CARDS.

No. 10,468. Reissued Apr. 15, 1884.

WITNESSES:
T. S. West
Wm. T. Emerson.

INVENTORS:
G. FLEWWELLING,
G. J. HARRIS.
BY Ho. W. Beadle & Co
ATTYS.

THE NORRIS PETERS CO., PHOTO-LITHO., WASHINGTON, D. C.

UNITED STATES PATENT OFFICE.

GILFORD FLEWWELLING AND GILBERT J. HARRIS, OF HAMPTON, NEW BRUNSWICK, CANADA, ASSIGNORS TO THE DIAMOND MATCH COMPANY, OF CONNECTICUT.

MACHINE FOR SAWING MATCH-CARDS.

SPECIFICATION forming part of Reissued Letters Patent No. 10,468, dated April 15, 1884.

Original No. 272,675, dated February 20, 1883. Application for reissue filed February 28, 1884.

*To all whom it may concern:*

Be it known that we, GILFORD FLEWWELLING and GILBERT J. HARRIS, of Hampton, county of Kings, Province of New Brunswick, Canada, have invented new and useful Improvements in Machines for Sawing Match-Cards; and we do hereby declare that the following is a full and exact description of the same, reference being had to the accompanying drawings, and to the letters of reference marked thereon.

This invention relates to that class of machines the members of which are adapted to point and slit a number of card-blanks clamped together, for the purpose of converting the same into match-cards with pointed ends; and it has for its main object the production of a machine which shall employ a revolving table for carrying the card-blank holders and revolving saws for slitting the cards, and yet be capable of slitting the cards to equal depths.

Its novelty consists, mainly, in the combination, with revolving slitting-saws and a revolving table for carrying the card-blank holders, of certain cam mechanism adapted at the proper time to thrust the holders containing the card-blanks into the line of action of the slitting saws, and to withdraw the same therefrom, as will be fully described hereinafter.

Figure 1:
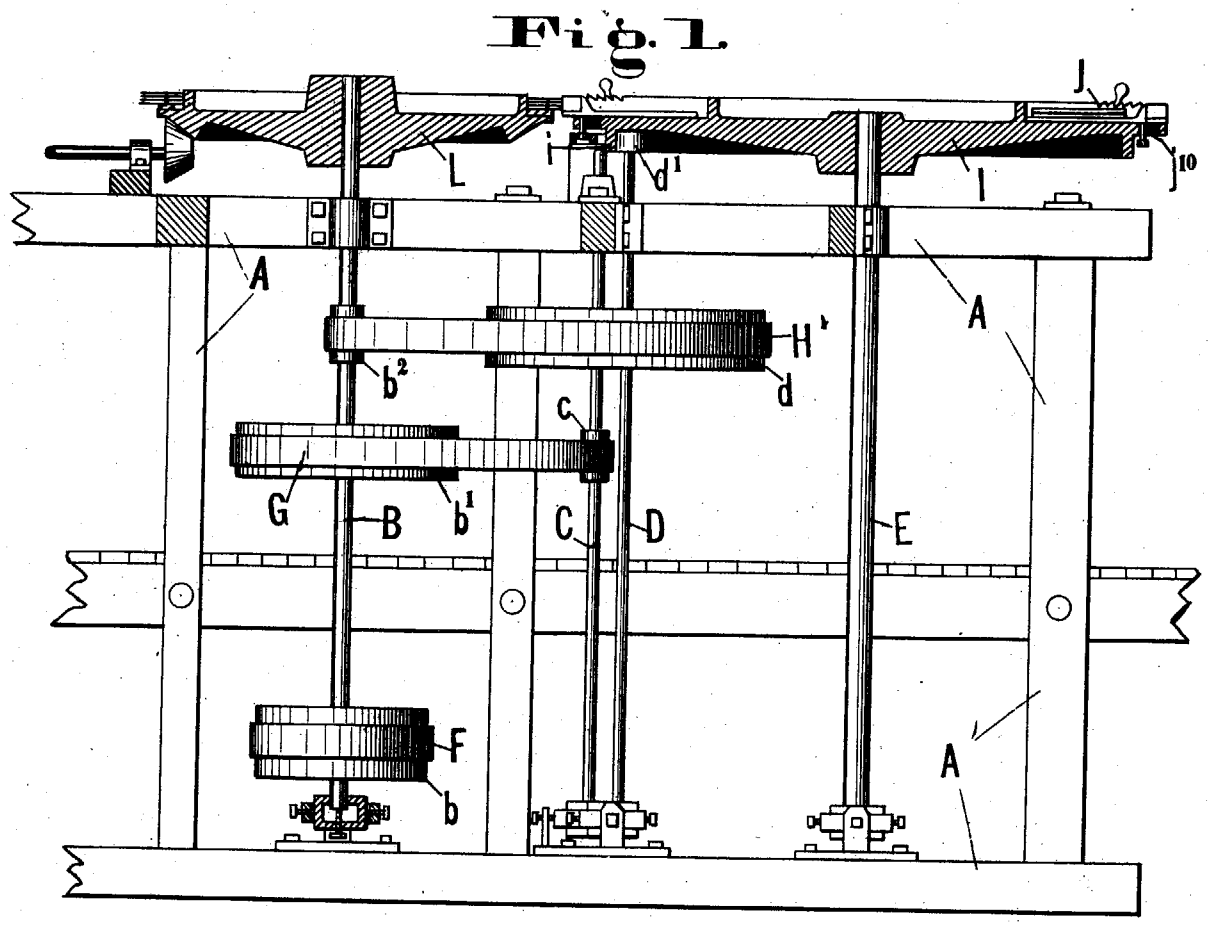
Figure 2:
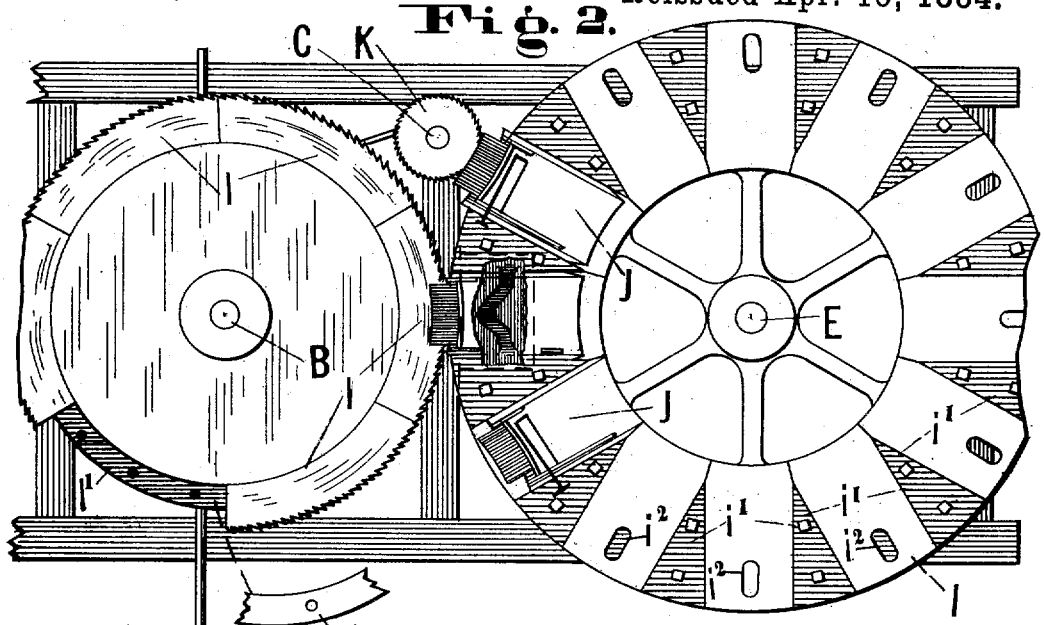
Figure 3:
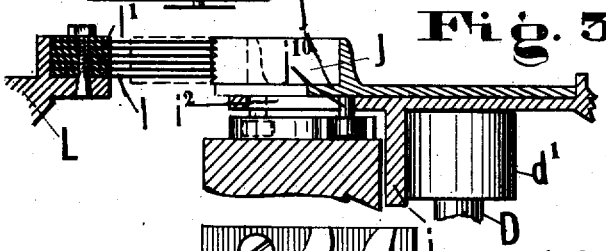
Figure 4:
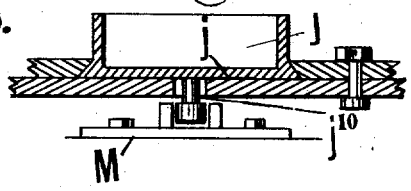
Figure 5:
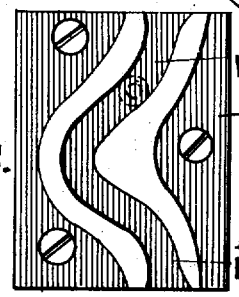
Figure 6:
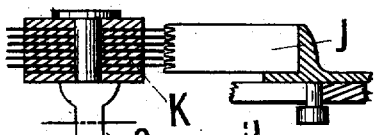
Figure 7:
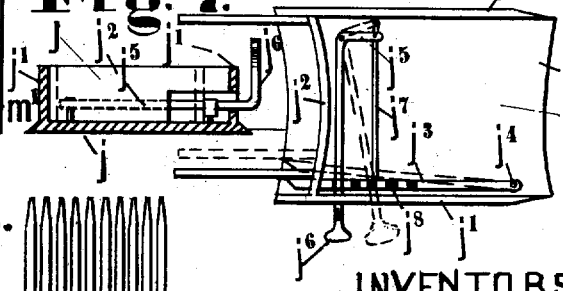

In the drawings, Figure 1 represents a side view of our improved machine, with the revolving table for carrying the card-blank holders and the revolving disk having the slitting-saws thereon in section; Fig. 2, a plan view of the machine, with certain portions broken away to show the construction below; Fig. 3, a sectional view showing the action of the cam mechanism, the slitting-saws, and the friction-disk $d'$, for actuating the work-table. Fig. 4 is a sectional view showing the action of the cam-groove upon the stud of the card-blank holder; Fig. 5, an enlarged view of the cam-groove; Fig. 6, a sectional view showing the action of the pointing-saws; Fig. 7, a sectional and plan view of one of the card-blank holders, and Fig. 8 a front view of one of the match-cards completed.

To enable others skilled in the art to make and use our improved machine, we will proceed to describe fully the construction and operation of the same.

For convenience and clearness, the following description will be divided into seven main divisions, as follows: first, the shaft and belts for actuating the working parts of the machine; second, the revolving table for carrying the card-blank holders; third, the card-blank holders; fourth, the pointing-saws; fifth, the slitting-saws; sixth, the cam mechanism; seventh, the general operation of the machine as a whole.

First, the shafts and belts for actuating the working parts of the machine:

A, Fig. 1, represents any suitable framework for supporting properly the moving parts.

B represents a shaft located at one end of the machine, upon the longitudinal center line, which is held in a vertical position by any proper bearing, as shown.

$b$ represents a large pulley located near the lower end of the shaft B; $b'$, a large pulley located near the center of the same, and $b^2$ a small pulley, located near the top of the same, as shown.

C represents a shaft located at one side of the machine, upon the transverse center line, which is held in a vertical position by any proper bearings, as shown.

$c$ represents a small pulley located near the center of the shaft C, as shown.

D represents a shaft located near the union of the longitudinal and transverse center lines, which is held in a vertical position by any proper bearings, as shown.

$d$ represents a large pulley located near the top of the shaft, and $d'$ a friction-disk located at the extreme top of the shaft D, as shown.

E represents a shaft located at one end of the machine, upon the longitudinal center line, which is held in a vertical position by any proper bearings, as shown. The shaft B supports the disk L, carrying the slitting-saws, hereinafter referred to, and gives proper revolution to the same. The shaft C supports the gang of pointing-saws K, hereinafter referred to, and gives them proper revolution. The shaft D supports the friction-disk $d'$, and gives proper movement to the same. The shaft D supports the disk I of the work-table as the same is revolved by the friction-disk $d'$.

F represents the main belt passing about the pulley $b$, by means of which motion is communicated to the shaft B from any proper source of power.

G represents a belt passing about the pulleys $b'$ $c$, by means of which movement is communicated from the shaft B to the shaft C.

H represents a belt passing about the pulleys $b^2$ $d$, by means of which movement is communicated from the shaft B to the shaft D. By means of the belt G and the pulleys $b'$ $c$ the movement of the shaft B is converted into a very rapid movement of the shaft C. By means of the belt H and the pulleys $b^2$ $d$ the movement of the shaft B is converted into a very slow movement of the shaft D. By means of the friction-disk $d'$ of the shaft D bearing upon the flange $i$ of the table I, hereinafter referred to, the slow movement of the shaft D is converted into a still slower movement of the table I.

Second, the revolving table for carrying the card-blank holders:

I, Figs. 1 and 2, represents the revolving table for carrying the card-blank holders, consisting of a disk rigidly secured to the top of the shaft E, and provided upon its lower side with an annular flange, $i$, Figs. 1 and 3, depending from the same near the edge in proper position to engage with the friction-disk $d'$ of the shaft D, as shown.

$i'$ $i'$, Fig. 2, represent triangular blocks bolted to the upper face of the table at suitable distances apart, which blocks are provided with overhanging edges, as shown in Fig. 4. By means of these blocks a series of radial ways are formed, adapted to permit the proper movement of the card-blank holders, hereinafter described.

$i^2$ represents a slot in the radial ways, which slot is located on the longitudinal center line, the purpose of which will be hereinafter described.

Third, the card-blank holders:

J, Figs. 2, 3, 4, and 7, represents one of the card-blank holders, consisting of a base-plate, $j$, Fig. 7, parallel side plates, $j'$ $j'$, having inclined projections adapted to engage with the overhanging edges of the blocks $i'$ $i'$ of the table I, as shown in Fig. 4, and a concave back plate, $j^2$, all rigidly secured together in any proper manner, as shown.

$j^3$ represents an independent side plate held at its rear end by a pivot, $j^4$, as shown.

$j^5$ represents an elbow-lever having a handle, $j^6$; and $j^7$, a connecting-rod, by means of which the short arm of the lever is united to the independent side plate, as shown.

$j^8$ represents a series of notches upon the upper edge of the side plate, by means of which the lever $j^5$ may be held in any desired position.

Figure 8:
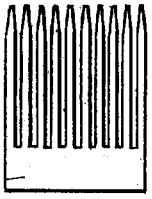

$j^9$, Fig. 8, represents one of the cards made by the machine. The blanks from which these cards are made are equal in length and breadth to the finished match-card. A set of blanks, consisting of any proper number, is placed loosely in the holder, and adjusted against the concave back in such manner that the ends form a concave line in front, as shown in Fig. 2. The lever $j^5$ is then actuated to move the independent side piece, $j^3$, on its pivot $j^4$, and securely clamp the blanks in this position.

$j^{10}$, Fig. 4, represents a stud projecting downward from the base-plate $j$ of the card-holder, near the front end of the same, on the longitudinal center line, which is provided below with a friction-roller, as shown. When the card-blank holder is in position, as shown in Fig. 2, its stud $j^{10}$ projects through the slot $i^2$ of the table into proper position to enter the groove of the cam M, hereinafter referred to, at the proper time in the revolution of the table, as shown in Figs. 3 and 4.

Fourth, the pointing-saws:

K, Figs. 2 and 6, represents a gang of small saws located upon the top of the shaft C, which saws are separated from each other in any proper manner, and so shaped upon the edge as to cut away the ends of the matches on each side and form points, in the manner well understood. These saws are located upon the machine in such position, as shown in Fig. 2, that the pointing of the match-card is performed before the card-blanks are presented to the action of the slitting-saws.

Fifth, the slitting-saws:

L, Figs. 1 and 3, represents a disk rigidly secured to the top of the shaft B, which is provided upon its outer edge with a recessed portion adapted to furnish a proper bed for the segmental saw-sections $l$ $l$ of the slitting-saws.

$l'$ $l'$ represent rings or washers located between the saws for the purpose of separating them the proper distance apart, these rings or washers equaling in thickness the thickness of the individual splints of the card in the direction of the width of the card. By constructing the saws of segmental portions, as shown, it is possible to obtain larger sizes than is otherwise possible of the very thin gage required.

Sixth, the cam mechanism:

M, Figs. 4 and 5, represents a cam-plate, which is located on the frame-work beneath the revolving table, near that side which is adjacent to the slitting-saws, and on the longitudinal center line of the machine, as shown in Fig. 2, which cam-plate is provided with a continuous groove having a portion, $m$, Fig. 5, inclining outward toward the slitting-saws, and a portion, $m'$, inclining inward from the slitting-saws, as shown.

$j^{10}$ represents the stud of the card-blank holder, before referred to, which is adapted at the proper time in the movement of the machine to enter the open end of the portion $m$ of the cam-groove and pass through the same and through the portion $m'$, in the manner well understood. By means of the portion $m$ having a sharp incline leading toward the slitting-saws, the stud $j^{10}$ of the holder is caused to move the holder so that the card-blanks are thrust quickly into the line of the saws' action to the extreme depth, as shown in Fig. 2. By means of the portion $m'$ the stud $j^{10}$, after the point of the cam-groove has been reached, is caused to move the holder so that the match-cards thus formed are quickly withdrawn from the line of the saws' action.

Seventh, the general operation of the machine as a whole:

The general operation of the machine is substantially as follows: A slow movement having been communicated to the revolving table carrying the card-blank holders, a rapid movement to the slitting-saws, and a still more rapid movement to the pointing-saws, by the actuating mechanism described, the holders are supplied with card-blanks of the proper dimensions, previously prepared, and these blanks are securely clamped in the holders J by the mechanism described, in such manner that the front ends of the blanks form a concave line, which coincides with the curved line of the saw, as shown in Fig. 2. By the revolution of the machine each holder is presented in turn first to the pointing-saws, then to the slitting-saws, and the card-blanks contained therein are properly acted upon by each. Each holder, after passing the pointing-saws, is caused by the sharp incline of the portion $m$ of the cam-groove to enter the whole face of the entire set of card-blanks very nearly together, and hence the tendency of the saws to run improperly and spoil the cards, when entered at one end, is avoided. By this portion $m$ of the cam-groove the blanks are entered to the full depth required, as shown in Fig. 2. By the portion $m'$ of the cam-groove the holders are actuated to move the completed cards from the line of the saws' action. By the continuous revolution of the machine the holders are brought into the proper position to permit the removal of the completed match-cards and the inserting of new blanks. The match-cards are all cut to an equal depth, because the card-blanks are arranged in a concave line coinciding with the curve of the saw, and because the blanks are quickly thrust into and quickly withdrawn from the line of the saws' action, as shown in Fig. 2.

Some of the advantages of the described construction are as follows: By constructing the slitting-saws in segments, as described, it is possible to make the same of very thin gage, with a circumference large enough to coincide with the entire face of a set of match-cards. By the use of a revolving table for carrying the card-blank holders, it is possible to prepare a quantity of the work for the saws beforehand, and allow it to pass continuously thereto without attention. By the use of the revolving slitting-saws and the cam mechanism in connection with the concave card-blank holders, it is possible with a circular saw to slit all the cards to an equal depth.

Having thus fully described our invention, what we claim as new, and desire to secure by Letters Patent, is—

1. In a machine for sawing match-cards, the combination of the following elements: first, a revolving table having a series of independent holders for the card-blanks; second, a gang of circular slitting-saws; and, third, cam mechanism, substantially as described, adapted to cause the holders at the proper time to thrust the card-blanks into the line of the saws' action, and to withdraw them therefrom, substantially as described.

2. In a machine for sawing match-cards, a revolving table with a series of card-blank holders having a capacity for radial movement upon the table, and cam mechanism, substantially as described, for moving the holders to present the blanks to the mechanism for acting upon the same.

3. In a machine for sawing match-cards, a revolving table with a series of card-blank holders adapted to hold the card-blanks with their ends in a concave line, and cam mechanism, substantially as described, for moving the holders to present the blanks to the slitting-saws, as described.

4. In a machine for sawing match-cards, the combination of the following elements: a revolving table having a series of independent holders for the card-blanks, a gang of circular pointing-saws, a gang of circular slitting-saws, and cam mechanism, substantially as described, for moving the card-blanks into and out of the line of action of the slitting-saws.

5. The combination, with the horizontal disk I, arranged on shaft E, and carrying the card-blank holders J, of the clamp-bar $j^3$, pivoted at $j^4$, the mechanism $j^5$ $j^6$ $j^7$, and the notches $j^8$, whereby the blanks may be held in the holders, as described.

6. The combination, with the disk I, provided with the movable blank-holders, of the saws mounted on the top of a shaft, $c$, and the segment-saws $l$, attached to the rim of disk L, and having washers $l'$, whereby the blocks are first grooved and then slitted the required depth, as described.

7. In combination with the holders carrying roller-studs and sliding in disk I, the detachable piece $i'$ and the grooved cam M, arranged under said disk on a support, as and for the purpose described.

This specification signed and witnessed this 22d day of February, 1884.

GILFORD FLEWWELLING.
GILBERT J. HARRIS.

Witnesses:
W. J. FLEWWELLING,
W. H. FROST.